United States Patent
Gunnarsson

(10) Patent No.: US 6,216,846 B1
(45) Date of Patent: Apr. 17, 2001

(54) METHOD AND AN APPARATUS FOR TURNING BOARDS

(75) Inventor: Cenneth Gunnarsson, Växjövägen (SE)

(73) Assignee: C Gunnarssons Verkstads AB, Vislanda (SE)

( * ) Notice: Subject to any disclaimer, the term of this patent is extended or adjusted under 35 U.S.C. 154(b) by 0 days.

(21) Appl. No.: 09/125,421

(22) PCT Filed: Feb. 14, 1997

(86) PCT No.: PCT/SE97/00234

§ 371 Date: Aug. 25, 1998

§ 102(e) Date: Aug. 25, 1998

(87) PCT Pub. No.: WO97/30830

PCT Pub. Date: Aug. 28, 1997

(30) Foreign Application Priority Data

Feb. 26, 1996 (SE) .................................................. 9600714

(51) Int. Cl.$^7$ ............................................... B65G 47/27
(52) U.S. Cl. ....................... 198/413; 198/407; 198/415
(58) Field of Search ................................... 198/413, 415, 198/403, 407, 410, 411, 345.1; 414/768, 758, 780

(56) References Cited

U.S. PATENT DOCUMENTS

| | | | |
|---|---|---|---|
| 568,949 | * 10/1896 | Huber | 198/415 |
| 2,686,603 | 8/1954 | Lawson . | |
| 3,426,882 | 2/1969 | Korth . | |
| 4,119,216 | * 10/1978 | Pryor et al. | 198/413 |
| 4,471,865 | * 9/1984 | Johnson | 198/415 |
| 4,484,675 | 11/1984 | Doherty et al. . | |
| 4,669,602 | * 6/1987 | Ouellette | 198/413 |
| 5,143,197 | * 9/1992 | Sauer | 198/410 |
| 5,363,950 | * 11/1994 | Lacuna et al. | 198/415 |
| 5,518,103 | * 5/1996 | Achelpohl et al. | 198/415 |

FOREIGN PATENT DOCUMENTS

| | | |
|---|---|---|
| 3150375 A1 | 11/1982 | (DE) . |
| 3546087 A1 | 6/1987 | (DE) . |
| 421 505 | 1/1982 | (SE) . |

* cited by examiner

*Primary Examiner*—Douglas Hess
(74) *Attorney, Agent, or Firm*—Smith, Gambrell & Russell, LLP

(57) ABSTRACT

A method of turning boards (2) comprises the steps that the boards (2) are transported on a conveyor (1) with conveyor dogs (4), with their longitudinal direction transverse to the conveyor (1). The boards (2) are accelerated relative to the conveyor (1) until the front edges (13) of the boards (2) abut against the rear edge (14) of the next dog (4). Lifting devices (16) which move synchronously with the conveyor (1) lift the front edges of the boards (2) at the same time as the boards (2) are moved towards the lifting devices (16), whereby the boards (2) are turned with their front edges facing upwards and backwards. An apparatus for turning boards comprises a first conveyor (1) with dogs (4) for transport of the boards (2), and a second conveyor (11) with an upper part (12) which, on the first conveyor (1), shunts the boards from one dog (4) to the next. The lifting devices (16) are disposed to move synchronously with the first conveyor (1) and gradually to be raised immediately behind the dogs (4) of the first conveyor.

14 Claims, 2 Drawing Sheets

METHOD AND AN APPARATUS FOR TURNING BOARDS

TECHNICAL FIELD

Figure 1:
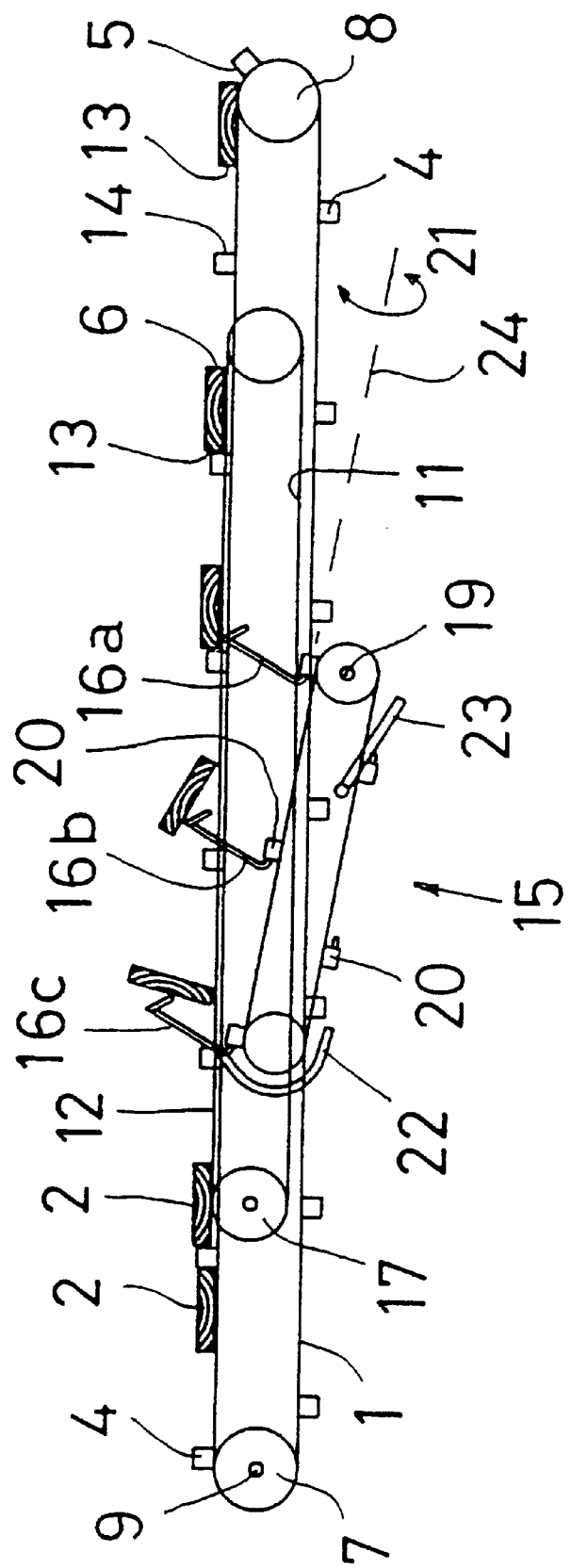

The present invention relates to a method of turning boards which are transported with their longitudinal direction transverse to the direction of movement of a conveyor with uniformly spaced conveyor dogs, the boards being at least partly driven by the front sides of the dogs in abutment against the rear edges of the boards.

The present invention also relates to an apparatus for turning boards and comprises a first conveyor with uniformly spaced conveyor dogs for transport of the boards with their longitudinal direction transverse to the direction of movement of the conveyor.

BACKGROUND ART

In the refining of timber in the form of boards in sawmills, planing mills, furniture factories or the like, it is often necessary that the boards be turned upside down between different working operations or in order to carry out quality inspection. Situations also arise when only certain boards in a batch are to be turned over. Such turning of boards has hitherto largely been carried out manually.

PROBLEM STRUCTURE

The present invention has for its object to devise the method disclosed by way of introduction such that it permits a fully automatic turning of the boards upside down. The present invention also has for its object to devise the method such that only certain boards included in a batch are turned over. The present invention further has for its object to devise the method such that the boards may be handled at great speed and with a high degree of reliability without being damaged.

The present invention also has for its object to design the apparatus intimated by way of introduction such that it is capable of turning all or only certain boards included in a batch at great speed and with a high degree of reliability, that the apparatus is simple and operationally reliable and is also economical in manufacture and in operation.

SOLUTION

The objects forming the basis of the present invention in respect of the method will be attained if the method is characterized in that the boards are moved forwards in a direction of movement in relation to the conveyor such that the front edges of the boards are brought to the region of the rear side of the next dog in the conveyor, that lifting devices which are moved synchronously with the conveyor are brought into engagement with the undersides of those boards which are to be turned in the region at their front edges, that the lifting devices are gradually raised, and that the boards are subjected to a force in relation to the lifting devices forwardly in their direction of movement, whereby the boards are caused to turn over with their front edge facing upwards/rearwards.

The objects forming the basis of the present invention in respect of the apparatus will be attained if this is characterized by at least one second conveyor which is substantially parallel with the first and has an upper part at a slightly greater height than the upper part of the first conveyor, the second conveyor operating at greater speed of movement that the first, and a number of lifting devices which are disposed to move synchronously with the first conveyor and to be liftable in the region behind the dogs of the first conveyor.

Further advantages will be attained according to the present invention if the method is also given one or more of the characterizing features in and if the apparatus is given one or more of the characterizing features.

BRIEF DESCRIPTION OF THE ACCOMPANYING DRAWINGS

Figure 2:
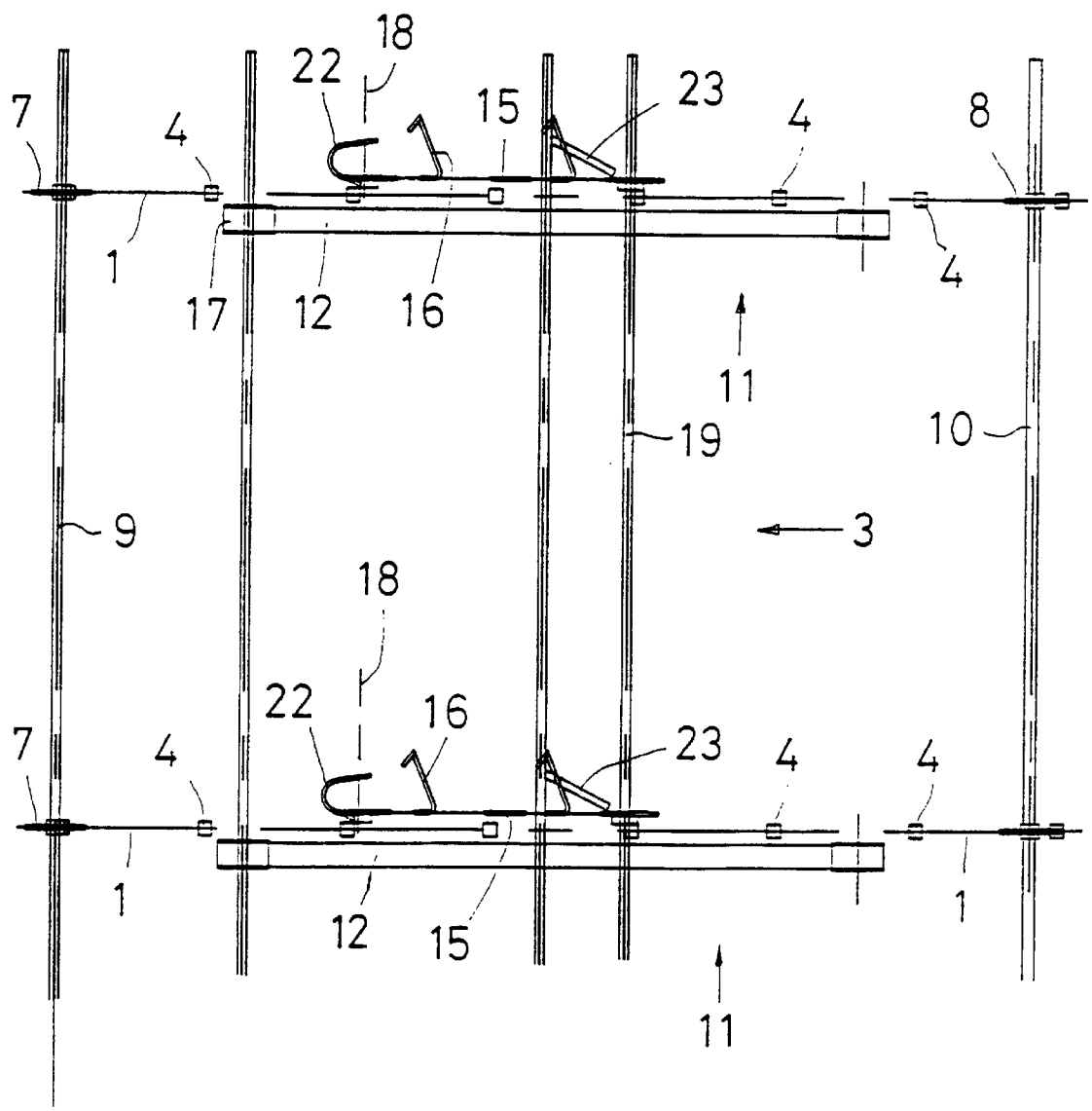

The present invention will now be described in greater detail hereinbelow, with reference to the accompanying Drawings. In the accompanying Drawings:

FIG. 1 schematically illustrates and apparatus for turning boards, seen from the side, i.e. in the longitudinal direction of the boards; and FIG. 2 is a top plan view of the same apparatus as in FIG. 1.

DESCRIPTION OF PREFERRED EMBODIMENT

The apparatus according to the invention comprises a first conveyor 1 which is intended for transporting boards 2 in a transport direction 3, from the right to the left in the Figures. The first conveyor has a number of uniformly spaced dogs 4 which, with their front sides 5, shunt the boards ahead of them in engagement with the rear edges 6 of the boards. In such instance, transport of the boards 2 takes place with the longitudinal direction of the boards transverse to the longitudinal direction of the first conveyor and transverse to the transport direction 3. Preferably, the longitudinal directions of the boards extend at right angles to both the transport direction 3 and the longitudinal direction of the conveyor 1.

The first conveyor may include a number, preferably at least two, of parallel-running chains, straps, belts or the like which are provided with the above-disclosed dogs. The number of such chains etc., depends on the length of those boards which are to be transported. FIG. 2 shows two such chains or the like.

The chains, straps or belts included in the first conveyor 1 run over wheels 7 and 8 which are supported on rotary shafts 9 and 10.

In addition to the chains, straps or belts included in the first conveyor, this conveyor may further include a number of longitudinally (along the transport direction 3) disposed slide rails which vertically support the boards 2 being transported. Instead of, or as a supplement to such slide rails, the chains etc. in the first conveyor may possibly have their upper regions supported in longitudinal guides which may also carry the weight of the boards.

The above disclosures as regards the cooperation of the first conveyor with the advanced boards applies at the infeed end of the conveyor and at its discharge end, i.e. at its right-hand and left-hand end, respectively. Along the central region of the conveyor, i.e. along a turning zone, the situation is different in that the first conveyor here at least partly functions as a brake which prevents the boards 2 in the transport direction 3 from being displaced past predetermined positions, as will be described in greater detail hereinbelow.

Within the turning zone, there is provided a second conveyor 11 which is also designed as a chain conveyor, strap conveyor or belt conveyor or the like. The second conveyor suitably has the same number of chains, straps or belts as the first conveyor, and these are disposed along and substantially parallel with the corresponding chains etc. in the first conveyor 1. The number of such chains etc. is adapted to the length of the boards 2 in the same manner as that which applies to the first conveyor.

The second conveyor 11 has its upper part 12 located at a slightly greater height than the upper part of the first conveyor 1. Further, the chains, straps or belts in the second conveyor are of a material which affords good friction against the boards 2. Hereby, the second conveyor (which advances at a greater transport speed than the first conveyor 1) will subject the boards to a force in the transport direction 3 relative to the first conveyor. This implies that the boards 2 within the turning zone, i.e. the longitudinal extent of the second conveyor 11, will be given higher speed by the second conveyor, so that the boards, with their front edges 13, will come into abutment against the rear edge 14 of the immediately preceding dog 4. This is clearly apparent at the right-hand end of the second conveyor 11 in FIG. 1.

That disclosed above in respect of the slide rails, longitudinal guides etc. in connection with the first conveyor 1 applies with equal analogy also to the second conveyor 11. It should also be observed that, regardless of the detailed design of these slide rails, guides, etc., it applies that the second conveyor carries the boards 2 at a height level which is slightly higher than the first conveyor.

The width of the open space between adjacent dogs 4 on the first conveyor 1 is, for reasons which will be apparent below, approximately twice as large as the maximum width of the boards 2 which are to be turned.

Within the turning zone, i.e. within the longitudinal extent of the second conveyor 11, there is provided a third conveyor 15. This is disposed along and beside the first conveyor 1 and preferably has the same number of chains, straps, belts or the like as the first conveyor. The third conveyor 15 is provided with a number of lifting arms or lifting devices 16 which move synchronously with the first conveyor in its transport direction 3. The lifting devices 16 are disposed behind the rear edges 14 of the dogs 4 and are disposed to be liftable within the turning zone.

In such cases where all boards 2 are to be turned, the lifting devices 16 may be fixedly disposed on the third conveyor 15 in positions relative thereto which are shown along the upper part of the third conveyor 15 in FIG. 1. This implies that, because of the upward inclination in the transport direction 3, the lifting devices 16 will be gradually raised within the turning zone.

In such cases where only certain boards 2 included in a batch are to be turned, the lifting devices 16 are movably disposed on the third conveyor 15, as will be described in greater detail hereinbelow.

It will be apparent from FIG. 1 that a lifting device 16a has just come into engagement with the underside of a board which, with its front edge, abuts against the rear edge 14 of a dog 4. The next lifting device 16b has raised the front portion of the board up and begins to turn the board over, with its front edge facing backwards. This turning of the board is facilitated by the fact that the second conveyor 11 subjects the board to a force in the direction of the transport direction of the first conveyor, i.e. in the direction of the arrow 3. This force is generated by the second conveyor 11 in that this moves more quickly than the lifting devices 16 so that the boards are shunted against the lifting devices. As a result of this force, the turning or rotation of the board about its longitudinal axis is facilitated and supported. The lifting device 16c has just raised the front edge of the board so high that the board loses its balance and is pivoted down backwards on the conveyor 11. For this backward pivoting of the board to be possible, the distance between adjacent dogs 4 should be approximately twice as large as the maximum width of turned boards. It will further be apparent from FIG. 1 that the lower edge of the board, which rests on the second conveyor, has been displaced in the direction of the arrow 3, for which reason the lifting device 16c no longer engages with the front edge of the board, now turned to face upwards, but instead with the central portion of the original underside of the board.

Once the board has been finally turned upside down by the lifting device 16c, it will once again be given increased speed in relation to the first conveyor 1, which is shown straight above the drive wheel 17 of the second conveyor 11.

The third conveyor 15 is carried by shafts 18 and 19 which are located at different heights so that the upper part of the third conveyor will thereby slope upwards in its direction of movement, whereby the lifting devices 16 which follow the upper part of the third conveyor will gradually be raised.

In order to permit turning of only certain boards included in a timber batch, the lifting devices 16 are suitably not permanently fixed in relation to the third conveyor 15, but are secured in sleeves 20 which have their longitudinal axes parallel with the parts of the third conveyor 15. The lifting devices 16 are pivotal in these sleeves, for which reason the lifting devices 16a, 16b and 16c are pivotal in accordance with the double headed arrow 21 about the pivot axis 24. Along the lower part, the lifting devices 16 are naturally pivotal in a corresponding manner about an axis which is parallel with the lower part of the conveyor.

The anchorage of the lifting devices 16 in the sleeves 20 disposed on the third conveyor is pivotal and without defined stops, for example in that the lifting devices have conical portions which, under spring bias, are axially pressed into corresponding conical apertures in the sleeves 20.

At the return areas of the third conveyor 15, there are provided guide rails or guides 22 and 23, where the guide 23 is disposed to open out the lifting devices 16 which, along the lower part of the conveyor, are collapsed to a state approximately parallel with the shafts 18 and 19, to outwardly pivoted activated, upstanding positions which are shown along the upper part of the conveyor. The guide 23 is movable between an active and opened position where it pivots out the lifting devices 16 and a passive, collapsed position where the lifting devices may pass without hindrance and without being pivoted out to the active positions which are shown along the upper part of the third conveyor. The guide 23 is coupled to a suitable prime mover for permitting pivoting of all or only certain of the lifting devices, corresponding to turning of all boards or only certain boards, respectively.

The guide 22 at the upper end of the third conveyor is designed for opposite pivoting of the lifting devices 16, i.e. for downward pivoting of them from the upstanding, active positions along the upper part of the conveyor to collapsed, substantially horizontal positions along the lower part of the conveyor.

The above-described apparatus operates as follows:

Boards 2 are fed in at the right-hand end of the first conveyor 1 and rest thereon or along slide rails or guides disposed with the conveyor. The boards 2 are driven by the conveyor 1, at least along a certain part of its length, in that the rear edges 6 of the boards abut against the front sides 5 of the dogs 4 of the conveyor 1. When the boards 2 have arrived at the turning zone, i.e. the longitudinal extent of the second conveyor 11, the boards are displaced forwards in the transport direction 3 in relation to the first conveyor 1. In such instance, the front edges 13 of the boards will strike the rear edges 14 of the dogs 4 and be held urged against them, at least along a certain portion of movement length of the second conveyor. The lifting devices 16 are brought into engagement with the undersides of the boards 2 in the region of their front edges 13. The lifting devices 16 are disposed to move synchronously with the first conveyor 1 and are located in the region immediately behind, or at least in the proximity behind the rear edges 14 of the dogs 4. Those lifting devices 16 which are to turn boards are disposed to be raised gradually so that the font edge portions of the boards 2 are thereby lifted up. At the same time, the boards are subjected to a force relative to the first conveyor and the lifting devices, the direction of this force corresponding to the transport drive direction 3 of the first conveyor. Hereby, the boards 2 will be displaced in the transport direction at the same time as their forward edge portions are lifted and braked and their rear/lower edges which rest on the upper part 12 of the second conveyor 11 are subjected to a shunting force so that the boards are thereby turned over with their front edges facing upwards and backwards so far that the boards are tilted backwards, with the original upper side facing downwards on the upper part 12 of the second conveyor 11.

In order to ensure the above-mentioned engagement or force between the boards 2 and the upper part 12 of the second conveyor 11, the boards are lifted by this upper part in relation to the level of the upper part of the first conveyor 1.

Once the lifting devices 16 have turned the boards, they are once again lowered to passive positions unless the intention is to turn all boards 2 included in a batch, since the lifting devices 16 are then suitably left in their opened, active positions or alternatively are fixedly mounted on the third conveyor 15. During their movements in the opened, active position, the lifting devices follow a path which is defined by a third conveyor 15 and which makes an acute angle with the movement direction of the first and second conveyors.

The present invention may be modified without departing from the spirit and scope of the appended claims.

What is claimed is:

1. A method of turning boards which are transported with a longitudinal direction of said boards transverse to the direction of movement of a first conveyor provided with uniformly spaced conveyor dogs, comprising:
    at least partly driving the boards by the front sides of the dogs in abutment against the rear edges of the boards, wherein the boards are moved forwards in the direction of movement in relation to the first conveyor such that the front edges of the boards are brought to the region of the rear side of the next dog in the conveyor;
    engaging lifting devices with the undersides of those boards which are to be turned in the region of their front edges, wherein said lifting devices are moved substantially synchronously with the conveyor;
    gradually raising the lifting devices;
    subjecting the boards to a force in relation to the lifting device forwardly in their direction of movement, wherein the boards are turned over with their front edge facing upwards/rearwards; and
    engaging at least one lifting device with each board, such that said at least one lifting device follows the board during turning of the board.

2. The method as claimed in claim 1, wherein the boards in their forward displacement relative to the first conveyor are lifted slightly therefrom.

3. The method as claimed in claim 1, wherein the lifting devices are lowered after turning of the boards.

4. The method as claimed in claim 1, wherein the lifting devices are carried by a third conveyor which, in a vertical plane, makes an acute angle with the first conveyor.

5. The method as claimed in claim 1, wherein the boards in their forward movement relative to the first conveyor and in their action relative to the lifting devices are acted on by at least one second conveyor.

6. The method as claimed in claim 5, wherein the boards are lifted slightly by the second conveyor relative to the first.

7. An apparatus for turning boards comprising:
    a first conveyor with uniformly spaced conveyor dogs for transport of the boards, with a longitudinal direction of said boards transverse to the direction of movement of the conveyor;
    at least one second conveyor which is substantially parallel with the first and has an upper part at a slightly greater height than the upper part of the first conveyor, the second conveyor operating at greater speed of movement than the first; and
    a number of lifting devices which are disposed to be liftable so as to engage with the boards at forward portions of undersides of the boards, during turning of the boards with the front edge of said boards upwards/rearwards,
    wherein the lifting devices are disposed on a third conveyor and are movable synchronously with the first conveyor.

8. The apparatus as claimed in claim 7, wherein the third conveyor, seen in a vertical plane along its movement direction, makes an acute angle with the first and the second conveyors.

9. The apparatus as claimed in claim 7, wherein at the end regions of the third conveyor, there are disposed guide rails or abutments for outward pivoting of the lifting devices to active positions at the beginning of the conveyor and for downward pivoting thereof to passive positions at the beginning of the conveyor and for downward pivoting thereof to passive positions at the end of the conveyor.

10. The apparatus as claimed in claim 9, wherein the abutment at the beginning of the third conveyor is movable between an active position where it pivots out passing lifting devices to their active positions, and a passive position where lifting devices pass unhindered in their passive positions.

11. The apparatus as claimed in claim 7, wherein the first, the second and the third conveyors are disposed side-by-side.

12. The apparatus as claimed in claim 7, wherein said lifting devices are fixedly disposed on the third conveyor.

13. The apparatus as claimed in claim 7, wherein said lifting devices are pivotally secured on the third conveyor and are pivotal about pivot axes which are substantially parallel with parts of said third conveyor, the distances between adjacent lifting devices substantially corresponding to the distance between adjacent dogs.

14. The apparatus as claimed in claim 7, wherein the free spaces between adjacent dogs are approximately of the same size as twice the width of those boards which are to be turned.

* * * * *